Patented Feb. 5, 1935

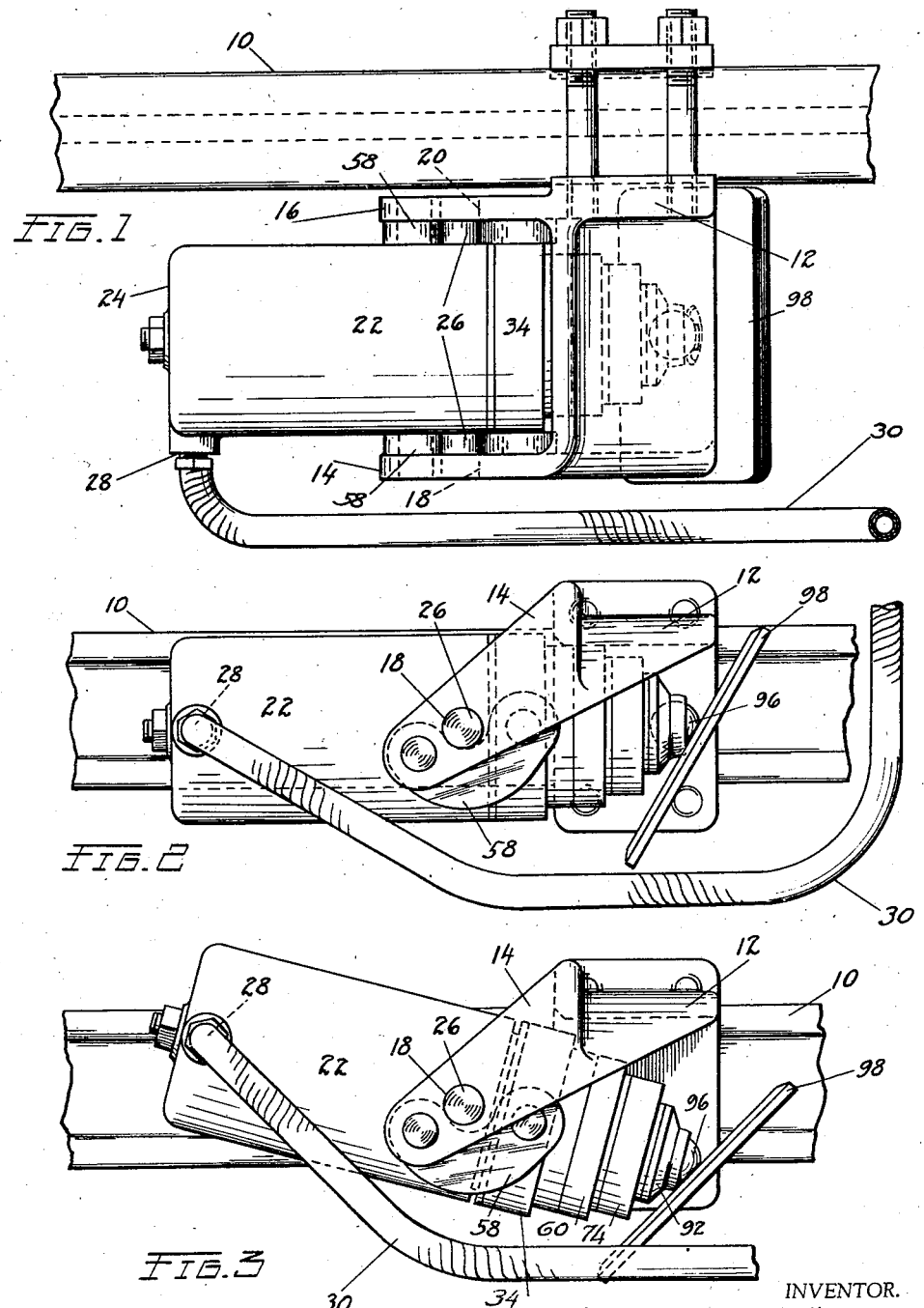

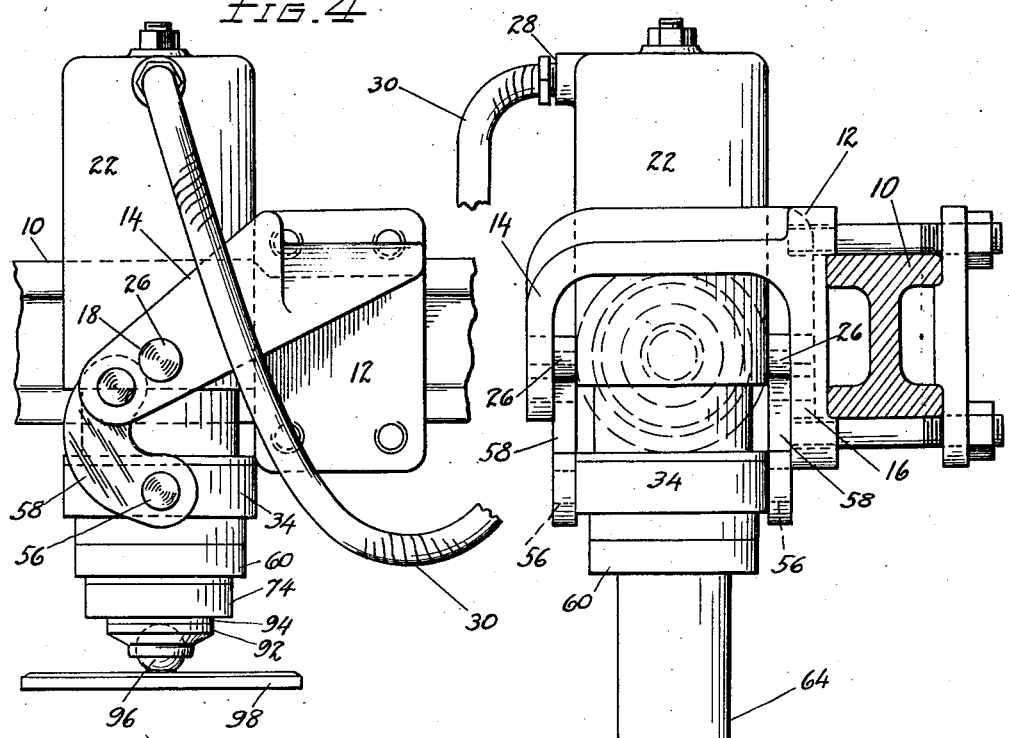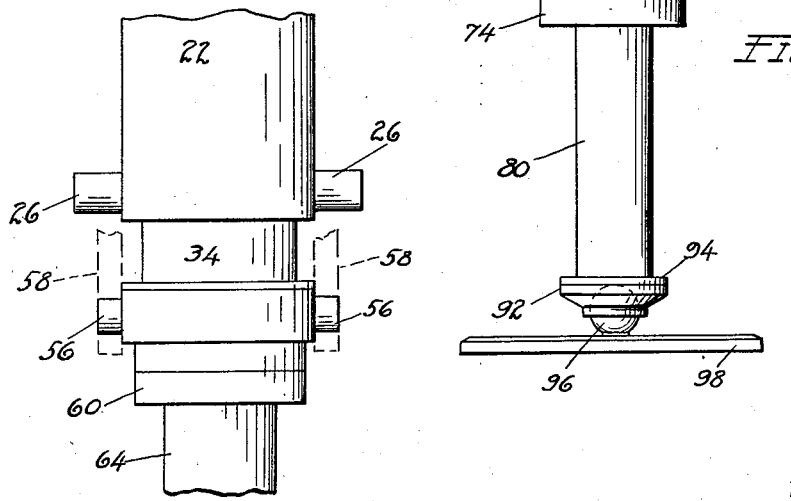

1,990,047

UNITED STATES PATENT OFFICE 1,990,047

HYDRAULIC JACK

Andrew O. McCollum, Detroit, Mich., assignor to Hydraulic Brake Company, Detroit, Mich., a corporation of California Application May 11, 1933, Serial No. 670,614

4 Claims. (Cl. 254—86)

This invention relates to jacks, and more particularly to hydraulic jacks.

In the illustrated embodiment of the invention a bracket secured to the axle of a vehicle supports a jack parallel to the axle of the vehicle. The jack is of a hydraulic type including a cylinder, a piston movable in the cylinder and a return spring for the piston. This piston includes a plurality of telescopic sleeves, return springs for the sleeves, and a foot pivotally attached to the outer end of the inner sleeve for engaging the ground. The jack is rotatably supported on the bracket. The piston, including the sleeves, is moved outward by fluid pressure, and the piston is so connected to the bracket that upon initial movement of the piston the jack is moved from horizontal position to vertical position. By reason of this structure the jack will occupy but small space, and it may be carried on the axle of the car without interference with any of the parts of the vehicle.

An object of the invention is to provide a fluid operated jack and means for actuating the jack to move it from horizontal position to vertical position.

Another object of the invention is to provide a fluid operated jack for motor vehicles having means operable to movement of the piston for moving the jack from one position to another before extending the piston to engage the ground and elevate the vehicle.

A further object of the invention is to provide a fluid operated jack for motor vehicles having means for moving the jack from horizontal position to vertical position before extending the piston of the jack to engage the ground, and means for automatically returning the piston and the jack to normal position upon release of applied pressure.

With these and other objects in view the invention includes various details of construction which will appear from the following description taken in connection with the drawings, and in which,—

Figure 1 is a top plan view of a jack embodying the invention;

Figure 2 is a front elevation illustrating the jack in retracted position;

Figure 3 is a similar view illustrating the jack after its initial movement;

Figure 4 is a similar view illustrating the position of the jack at the start of the piston;

Figure 5 is a side elevation of the jack with its piston fully extended;

Figure 6 is a fragmentary view; and

Figure 7:
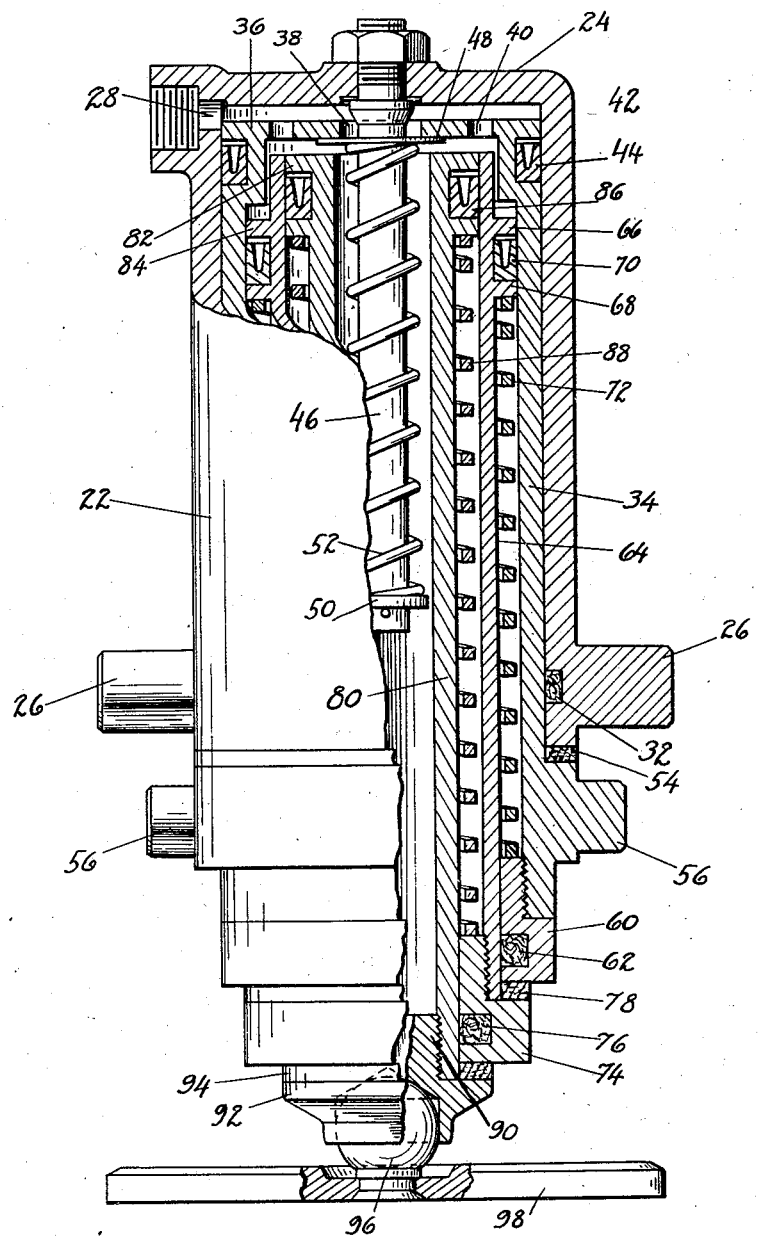
Figure 7 is a side elevation, partly in section.

Referring to the drawings for more specific details of the invention, 10 represents a vehicle axle having suitably secured thereto a support or bracket 12. The bracket has corresponding spaced arms 14 and 16 provided with oppositely disposed apertures 18 and 20.

A cylinder 22, closed at one end as by a head 24, has near its other end trunnions 26 journaled in the apertures 18 and 20 in the arms 14 and 16. The closed end of the cylinder 22 has an inlet port 28 tapped for the reception of one end of a conduit 30, the other end of which may be suitably attached to a fluid compression means, not shown, and arranged within the cylinder near its open end is a packing gland 32 containing suitable packing material.

A piston 34 is positioned for reciprocation in the cylinder 22. This piston includes a cylinder closed at one end as by a head 36 provided with an axial opening 38 and a plurality of ports 40, and the head has a circumferential groove 42 in which is positioned a leak-proof cup 44. A pin 46 supported concentrically on the head 24 of the cylinder 22 extends through the opening 38. This pin has sleeved thereon a washer 48 flapped against the back of the head 36 over the opening 38, a collar 50 suitably secured against displacement, and a compression spring 52 between the washer and the collar for urging the piston 34 toward the head of the cylinder 22.

The piston 34 has a shoulder near its open end on which is positioned a washer 54 providing a cushion seat for the open end of the cylinder 22 when the piston is in a retracted position. The piston 34 has diametrically disposed trunnions 56 connected as by links 58 to the free ends of the arms 14 and 16. As shown, the links 58 are curved to provide pockets for the trunnions 26 on the cylinder 22 when the jack is in retracted position. Upon movement of the piston 34 against the resistance of the spring 52, pull is imposed on the arms 14 and 16 through the links 58 resulting in turning the cylinder 22 on its trunnions 26 and moving the jack bodily from horizontal position to vertical position, where it rests against the bracket.

A packing ring 60 having a packing gland 62 filled with suitable packing material is threaded in the open end of the piston 34. The packing ring 60 supports for reciprocation a sleeve 64 having near its upper end spaced circumferential flanges 66 and 68 slidably engaging the inner wall of the piston 34. A leak-proof cup 70 is fitted between the flanges, and arranged on the sleeve 64 between the packing ring 60 and the flange 68 is a compression spring 72.

A packing ring 74 threaded in the outer end of the sleeve 64 has a packing gland 76 and a shoulder supporting a washer 78 providing a cushion seat for the outer end of the sleeve 64. The packing ring 74 supports for reciprocation a sleeve 80 having on its inner end spaced circumferential flanges 82 and 84, slidably engaging the inner wall of the sleeve 64, and a leak-proof cup 86 is positioned between the flanges 82 and 84, and a spring 88 is interposed between the flange 84 and the packing ring 74.

The outer end of the sleeve 80 has threaded therein a plug 90 provided with a flange 92 supporting a washer 94 which provides a cushion seat for the packing ring 74, and the plug is connected as by a ball and socket joint 96 to a plate 98, constituting the foot of the jack.

Assuming that the jack is filled with suitable fluid and is properly connected in a system including a fluid compression means, under these conditions, when fluid is introduced into the jack through the port 28, pressure is applied to the head 36 of the piston 34, causing the piston to move outward against the resistance of spring 52.

Outward movement of the piston 34 imposes pull through links 58 on the arms 14 and 16. The trunnions 56 on the piston 34 are diametrically disposed, and the pivots connecting the links to the arms are below the longitudinal axis of the piston, hence, when the piston moves outward, the pull imposed on the arms 14 and 16 rotates the jack on its trunnions 26 and moves the jack from horizontal position to vertical position where it rests against the bracket 12.

Further pressure in the cylinder causes outward movement of the sleeve 64 against the resistance of the return spring 72 followed by outward movement of the sleeve 80 against the resistance of return spring 88. The sleeve 80 has a foot attached to its outer end for engagement with the ground. Upon introducing additional fluid into the jack after the foot engages the ground, the sleeves 64 and 80 are moved outward and effectively elevate the vehicle.

Upon release of pressure, the return springs 72 and 88 cause inward movement of the sleeves 64 and 80, resulting in displacement of the fluid through the port 28 back into the system. The spring 52 then becomes effective to return the piston 34 to its normal position, causing further displacement of fluid from the jack back into the system and a gradual rotation of the jack on its trunnions from vertical position to horizontal position.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A fluid pressure jack comprising a cylinder having a fluid inlet, a fluid actuated piston movable in the cylinder having openings in its head, a packing ring threaded in the open end of the piston, a sleeve reciprocable in the packing ring having a flange engaging the inner wall of the piston, a spring interposed between the packing ring and the flange, a second packing ring threaded in the sleeve, an inner sleeve reciprocable in the second packing ring having a flange engaging the wall of the first sleeve, a spring between the second packing ring and the flange on the inner sleeve, a plug threaded in the inner sleeve, and a foot pivotally attached to the plug.

2. A fluid pressure jack comprising a support, a cylinder pivoted thereon, a piston movable in the cylinder, and a link having one of its ends pivoted to the piston and its other end pivoted on the bracket eccentrically to the pivot supporting the cylinder.

3. A fluid pressure jack comprising a support having spaced arms, a cylinder having trunnions journaled on the arms, a piston movable in the cylinder, and arcuate links connecting the piston to the arms providing pockets for the trunnions on the cylinder.

4. A fluid pressure jack comprising a support having spaced arms, a cylinder having trunnions journaled on the arms, a piston movable in the cylinder, trunnions on the piston, and arcuate links pivoted respectively at one end of the respective arms eccentrically to the trunnions on the cylinder and the other ends to the trunnions on the piston, said links providing a saddle for the trunnions on the cylinder when the piston is in retracted position.

ANDREW O. McCOLLUM.